United States Patent
Posselius et al.

[11] Patent Number: 6,125,620
[45] Date of Patent: Oct. 3, 2000

[54] BROKEN FLIGHT AUGER WITH ANTI-BRIDGING DEVICE

[75] Inventors: John H. Posselius, Ephrata; Walter V. Pype; Steven C. Young, both of Lancaster, all of Pa.

[73] Assignee: New Holland North America, Inc., New Holland, Pa.

[21] Appl. No.: 09/080,233

[22] Filed: May 18, 1998

[51] Int. Cl.[7] .................................................. A01F 12/00
[52] U.S. Cl. .................................. 56/16.4 R; 56/10.2 R; 460/7
[58] Field of Search ........................ 56/1, 10.2 R, 10.2 B, 56/10.2 C, 16.4 R, 16.6, 16.4 A, 16.4 B, 85, 87, 95, 97, 110, 471, DIG. 19; 460/5, 6, 7

[56] References Cited

U.S. PATENT DOCUMENTS

| | | | |
|---|---|---|---|
| 5,092,819 | 3/1992 | Schroeder et al. | 460/7 |
| 5,106,339 | 4/1992 | Braun et al. | 460/7 |
| 5,318,444 | 6/1994 | Kuzub et al. | 414/326 |
| 5,716,272 | 2/1998 | Nelson | 460/7 |

*Primary Examiner*—Robert E. Pezzuto
*Attorney, Agent, or Firm*—Griffin, Butler, Whisenhunt & Szipl, LLP

[57] ABSTRACT

In an agricultural harvester a characteristic of crop material is monitored or measured as the crop material is conveyed through a feed tube by an auger. To obtain a more uniform packing density of the crop material in a sensing region where the measurement is made, a section of the auger flight is removed. An upstream section of flighting pushes the crop material into and through the sensing region and after it has been pushed through the sensing region it is conveyed away from the sensing region by a downstream section of flighting. The velocity of the crop material being pushed through the sensing region is not uniform across the radius of the feed tube and a layer of slowly moving crop material is formed adjacent the wall of the feed tube. A strap-like wiper element is provided in the sensor region to wipe or disperse the slowly moving layer of crop material. The ends of the wiper element are fastened to the downstream extent of the upstream flighting section and the upstream extent of the downstream flighting section. An opening between the wiper and the auger shaft permits passage of crop material being pushed through the sensing region.

9 Claims, 1 Drawing Sheet

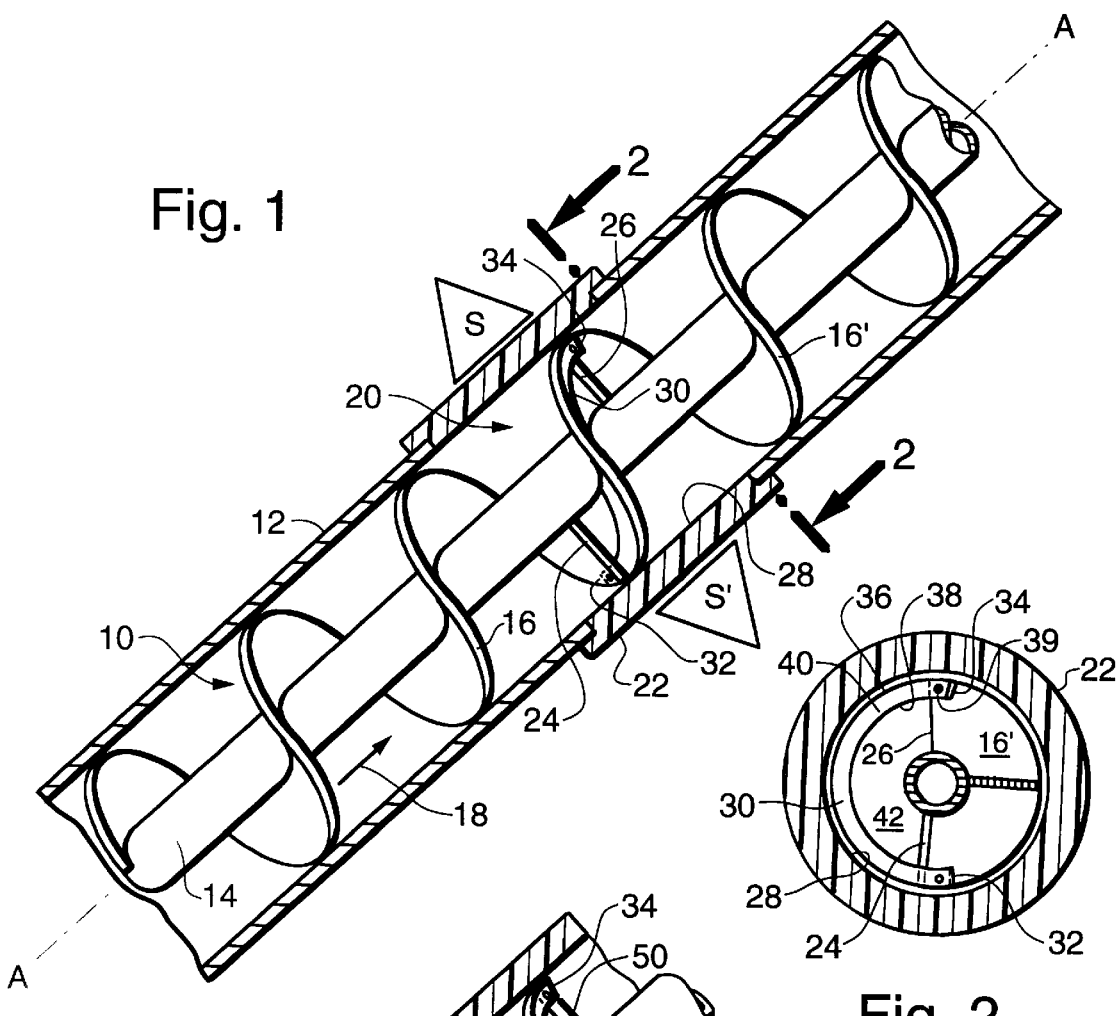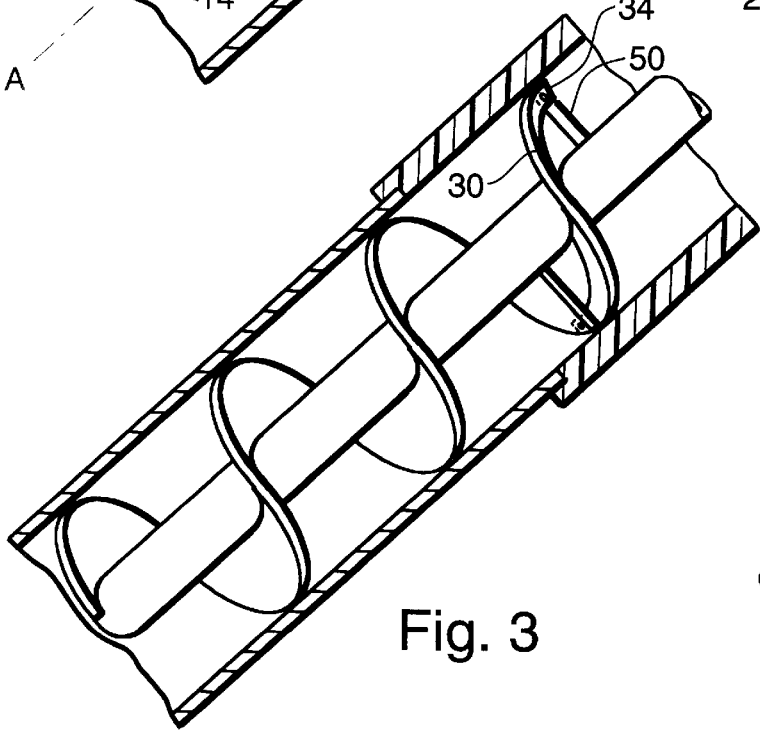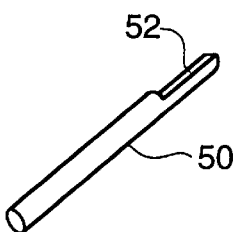

BROKEN FLIGHT AUGER WITH ANTI-BRIDGING DEVICE

FIELD OF THE INVENTION

The present invention relates to augers of the type used in agricultural harvesters to convey harvested crop material such as corn, soybeans, wheat, rice, oats, edible beans, and forage crops. More particularly, the invention provides a device for preventing bridging of the crop material in the region between two sections of an auger flight broken to accommodate a sensor.

BACKGROUND OF THE INVENTION

It is well known to provide an agricultural harvester with a sensor disposed adjacent a crop material feed tube for determining a crop material characteristic such as moisture content as the crop material is being pushed through the tube by an auger. The sensor may be an RF microwave sensor as disclosed by Hamid and Stuchly in the publication IEEE Transactions on Industrial Electronics and Control Instrumentation, Vol. IECI-22, May, 1975, or a capacitance or inductance sensor as disclosed in U.S. Pat. No. 5,092,819 to Schroeder et al. In order to develop an accurate measurement of the crop material moisture content these sensors require a constant packing density of the crop material as it moves through the sensing region. The Schroeder et al. patent teaches that the packing density may be made more uniform by providing an auger having a reduced radial dimension in the sensing region where the sensor senses the crop material. The reduced radial dimension makes the auger less efficient in pushing the crop material through the sensing region. The auger flight section upstream of the sensing region pushes the crop material into the sensing region where it accumulates until the region is full. Thereafter, as more crop material is pushed into the sensing region it forces crop material out of the sensing region and into the flight section downstream of the sensing region. The crop material in the sensing region is thus packed at a more or less uniform density.

The teaching of Schroeder et al. tends to produce a more uniform packing density in the sensing region but it is not suitable for use in RF microwave sensors unless the auger is specially constructed so that the portion extending through the sensing region is made of a material which is transparent to the microwave sensing signal. Otherwise, rotation of the flight in the field of the sensing signal causes a cyclic variation in the sensor output signal which is unrelated to the crop material moisture content.

To avoid the effect of rotation of the auger on the sensor output signal, a broken flight auger may be provided wherein that portion of the flight that would otherwise be located in the sensing region is completely removed from the auger. This leads to a further problem generally referred to as 'bridging'. A layer or 'bridge' of crop material is formed around the inner periphery of the crop material feed tube between the upstream and downstream sections of the flight. The crop material in this layer moves through the sensing region at a much slower rate than the crop material nearer the center of the crop material feed tube. Thus, a real time indication of the crop material moisture content as sensed by the sensor may not be the same as the moisture content of the crop material entering the sensing region.

SUMMARY OF THE INVENTION

An object of the invention is to provide an auger for conveying crop material in a downstream direction through a crop material feed tube, the auger comprising a rotatable shaft having thereon an upstream flighting section with a downstream end and a downstream flighting section having an upstream end, the upstream end being spaced from the downstream end, and a wiper for sweeping crop material from a region adjacent an interior wall of the crop material feed tube, the wiper being spaced from the shaft to define an opening through which the crop material is pushed, the wiper having a first end fastened to the downstream end of the upstream flighting section and a second end fastened to the upstream end of the downstream flighting section.

Another object of the invention is to provide an auger rotatable within a crop material feed tube and having no flight in a section rotating within a sensing region, the auger being characterized in that it has an anti-bridging device for assuring a more uniform rate of movement of crop material through the sensing region. The anti-bridging device comprises a strip-like element of non-metallic material having one end attached to an upstream flight section of the auger and a second end supported downstream of the sensing region. The element has an outer peripheral edge for sweeping crop material from the inner wall surface of the feed tube and an inner peripheral edge which is spaced from the auger shaft to permit crop material being pushed through the sensing region to pass between the element and the shaft. In the axial direction, the element extends a distance of about one-half the auger flight pitch distance.

In a first embodiment suitable for use when the sensing region is intermediate the ends of the auger, the second end of the element is attached to an auger flight section downstream of the sensing region. In a second embodiment suitable for use when the sensing region is located at the downstream extent of the auger, the second end of the element is attached to an arm supported from the auger drive shaft.

A further object of the invention is to provide, in an agricultural harvester, the combination comprising: a sensor disposed at a sensing region for sensing a crop material characteristic; a crop material feed tube extending through the sensing region; an auger comprising a rotatable shaft having an upstream flighting section thereon for conveying crop material through the feed tube in a downstream direction, the upstream flighting section terminating at a downstream end which is upstream relative to the sensing region whereby crop material conveyed into the sensing region by the upstream flighting section is packed as it is pushed through the sensing region; and a wiper disposed in the sensing region for sweeping crop material from an interior wall of the feed tube, the wiper being spaced from the shaft to define an opening through which the crop material is pushed.

Other objects and advantages of the invention and the manner of making and using it will become evident upon consideration of the following description and the accompanying drawings.

BRIEF DESCRIPTION OF THE DRAWINGS

FIG. 1 illustrates the sensing region of a monitor for monitoring a crop material characteristic, the crop material feed tube being shown in section to reveal the auger and anti-bridging device;

FIG. 2 is a view taken along the line 2—2 of FIG. 1 and showing the anti-bridging device;

FIG. 3 illustrates an alternative embodiment for supporting the anti-bridging device when the device is mounted at the end of an auger; and, FIG. 4 is a perspective view of the support used in the embodiment of FIG. 3.

DESCRIPTION OF PREFERRED EMBODIMENTS

In FIG. 1, an auger 10 is disposed within a crop material feed tube 12 of an agricultural harvester. The auger comprises a rotatable shaft 14 having broken auger flighting 16,16' attached thereto so that crop material entering the feed tube at an upstream end (left end in FIG. 1) is conveyed in the direction indicated by arrow 18 toward the downstream end of the tube. The crop material feed tube may be inclined or disposed vertically or horizontally within the harvester.

A conventional sensor or sensing apparatus S, S' is provided adjacent the crop material feed tube for sensing some characteristic of the crop material, its moisture content for example, as the crop material moves through a sensing region 20. Depending on the type of sensor, the crop material feed tube 12 may be provided with a tube section 22 at the sensing region, the tube section being made of a material which will not affect the measurement signal. For example, if the sensor is a microwave sensor the tube section 22 is made of a plastic or other material which is transparent to, that is, has minimal or no effect on, signals at the sensor operating frequency.

The auger flighting comprises an upstream auger flight section 16 located upstream of the sensing region 20 and a downstream auger flight section 16' extending downstream from the sensing region. In FIGS. 1 and 2, the downstream extent of the upstream auger flight section 16 is the edge 24 and the upstream extent of the downstream auger flight section 16' is the edge 26.

The section of the auger flight which would otherwise extend between edges 24 and 26 is removed because (1) rotation of the flight, which is made of metal, would impose a modulation on the sensor signal and (2) because the absence of flighting in the sensing region 20 results in a fairly uniform packing density of the crop material as described above. However, when flighting is entirely removed from the auger in the sensing region, the crop material being pushed through the sensing region does not move at a uniform rate across the diameter of the feed tube 12. The velocity profile is such that the crop material entering the sensing region 20 near the auger shaft 14 is pushed through the sensing region at a faster rate than the crop material entering the sensing region at or near the inner wall of the feed tube. A bridge or layer of very slowly moving or even stagnant crop material is thus formed adjacent the inner wall surface 28 of the feed tube, the bridge extending from the edge 24 to the edge 26.

In accordance with the present invention, an anti-bridging element in the form of a wiper 30 is provided for preventing the formation of the slowly moving layer of crop material by wiping or sweeping the crop material from the inner wall surface 28. Wiper 30 is a strap molded or otherwise formed from a non-metallic material or plastic such as nylon or ultra high molecular weight plastic that is transparent to frequencies in the range of the sensor operating frequency. The wiper has a first end 32 fastened to the downstream extent of the upstream flight section 16 and a second end 34 fastened to the upstream extent of the downstream flight section 16'. Any conventional fastening means 39 (FIG. 2) may be used provided they do not affect the sensor signal passing through the sensing region 20. As seen in FIG. 2, the dimension of surface 40 of the wiper extending between its outer edge 36 and its inner edge 38 is considerably less than the radial dimension of the auger flights so that an opening 42 exists between the auger shaft 14 and the inner edge 38. This permits packing of the crop material moving through the sensing region 20 to obtain the constant density necessary for accurate measurement of the crop material moisture content.

The outer edge 36 of the wiper is radially spaced from the auger shaft 14 by a distance that is preferably equal to or slightly less than the radial distance between the shaft and inner wall surface 28 of the feed tube 12 so that the edge moves adjacent to the wall surface as it rotates. Edge 36 need not press against or even contact the surface 28 so long as it rotates close enough to permit the wiper surface 40 to wipe or sweep crop material away from the surface.

The optimum width of wiper 30 in the radial direction depends on thickness of the layer of slowly moving crop material to be wiped from the surface 28. This thickness increases as the diameter of the crop material feed tube 12 increases. For a typical crop material feed tube having an internal diameter of about 9½", the width of the wiper from outer edge 36 to inner edge 38 may be about ½41.

FIG. 1 shows that a section of flighting corresponding to one-half the flight pitch distance has been removed at the sensing region 20, where the pitch distance is defined as the axial distance between a point on one flight and a corresponding point on an adjacent flight. In one commercially available harvester the pitch distance is 8½" hence the sensing region 20 is about 4" measured in the direction of axis A—A. Since the wiper 30 must overlap the upstream and downstream sections of flighting in order to permit fastening, the length of wiper 30 in the direction of the axis A—A must be greater than the axial length of the section of flighting removed at the sensing region 20 and thus may vary widely.

When the wiper 30 is fastened to the upstream and downstream sections of flighting its outer edge 34 has the shape of a part turn of a cylindrical helix which, as shown in FIG. 2 extends slightly more than 180° about the auger shaft 14. As the auger shaft 14 rotates, the surface 40 engages crop material on, or in close proximity to, the wall surface 28 and pushes the crop material in the downstream direction. The wiper in essence acts as an auger flight with no material moving surface adjacent the shaft which drives it.

The sensing region 20 is not always located intermediate the ends of the auger flighting as shown in FIG. 1 but in some harvesters may be located downstream of the downstream end of the auger flighting as illustrated in FIG. 3. In this case the downstream support for the wiper may be a support arm 50 rigidly affixed to the auger shaft 14 so as to extend radially therefrom at a location downstream of the sensing region. The second end 34 of the wiper 30 is fastened to the support arm by a fastening means such as a plastic bolt transparent to the signals in the range of the operating frequency of the sensor. The support arm may be provided with a flat surface 52 (FIG. 4) at its distal end where the wiper is fastened to it, the flat surface being oriented generally parallel to the plane of the wiper surface with which it mates so that the wiper is not stressed as it is fastened to the support.

Although specific preferred embodiments have been described in detail to illustrate the invention, it will be understood that various modifications and/or substitutions may be made in the described embodiments without departing from the spirit and scope of the invention as defined by the appended claims.

We claim:

1. An auger for conveying crop material in a downstream direction through a crop material feed tube, the auger comprising a rotatable shaft having thereon an upstream flighting section with a downstream end and a downstream flighting section having an upstream end, said upstream end being spaced from said downstream end, and a wiper for sweeping crop material from a region adjacent an interior wall of said crop material feed tube, said wiper being spaced from said shaft to define an opening through which the crop material is pushed, said wiper having a first end fastened to the downstream end of the upstream flighting section and a second end fastened to the upstream end of the downstream flighting section.

2. An auger as claimed in claim 1 in combination with a sensor disposed at a sensing region for sensing a characteristic of the crop material, said crop material feed tube extending through said sensing region and said wiper being disposed in said sensing region and spaced from said shaft to define an opening through which the crop material is pushed.

3. The combination as claimed in claim 2 and further comprising a support affixed to said shaft downstream of said sensing region.

4. The combination as claimed in claim 3 wherein said sensing region is located intermediate first and second ends of said auger and said support comprises a downstream auger flighting section for conveying the crop material after the crop material has passed through the sensing region.

5. The combination as claimed in claim 3 wherein said support comprises a support arm affixed to said auger shaft and extending radially therefrom, the wiper being fastened to a distal end of the support arm.

6. The combination as claimed in claim 2 wherein said wiper is an elongated member having an outer edge in the shape of a part cylindrical helix extending about 180° around said shaft.

7. The combination as claimed in claim 2 wherein said wiper is an elongated member having an outer edge moving adjacent the interior wall of said feed tube, an inner edge spaced from said shaft, and a surface extending between the inner and outer edges for moving crop material in the downstream direction.

8. The combination as claimed in claim 7 wherein said outer edge contacts the interior wall of the feed tube.

9. The combination as claimed in claim 7 wherein said outer edge does not contact the interior wall of the feed tube but rotates in close proximity thereto so that crop material at said interior wall is swept therefrom by said surface.

* * * * *